(12) United States Patent
Gallina et al.

(10) Patent No.: US 7,331,358 B2
(45) Date of Patent: Feb. 19, 2008

(54) DEVICE FOR FIXING A TAP HANDLE

(75) Inventors: Davide Gallina, Omegna (IT); Aldo Quirico, Novate Milanese (IT)

(73) Assignee: Metallurgica Gallina S.p.A., Omegna (VB) (IT)

( * ) Notice: Subject to any disclaimer, the term of this patent is extended or adjusted under 35 U.S.C. 154(b) by 21 days.

(21) Appl. No.: 11/327,646

(22) Filed: Jan. 9, 2006

(65) Prior Publication Data

US 2006/0151180 A1    Jul. 13, 2006

(30) Foreign Application Priority Data

Jan. 13, 2005    (EP) .................................. 05425012

(51) Int. Cl.
*E21B 19/16* (2006.01)
(52) U.S. Cl. .................. 137/315.15; 403/371
(58) Field of Classification Search ........... 137/315.15; 403/370, 371, 365
See application file for complete search history.

(56) References Cited

U.S. PATENT DOCUMENTS

| | | | | |
|---|---|---|---|---|
| 5,025,826 A | * | 6/1991 | Schoepe et al. | 137/315.15 |
| 5,810,504 A | * | 9/1998 | Rabinovich | 403/371 |
| 6,276,662 B1 | | 8/2001 | Bugatti | |
| 2004/0026648 A1 | | 2/2004 | Heimann et al. | |

FOREIGN PATENT DOCUMENTS

| | | |
|---|---|---|
| DE | 31 43 747 A1 | 5/1983 |
| DE | 43 44 151 A1 | 6/1995 |
| GB | 2 063 426 A | 6/1981 |

OTHER PUBLICATIONS

European Search Report of EP 05 42 5012, dated Apr. 19, 2005.

* cited by examiner

*Primary Examiner*—Kevin Lee
(74) *Attorney, Agent, or Firm*—Nixon & Vanderhye P.C.

(57) ABSTRACT

It is disclosed a device for fastening a tap handle in a removable way, wherein an actuating element is screwed into the control rod of a tap valve and acts on an elastically deformable element abutting against the inner wall of the hub portion of the handle.

20 Claims, 2 Drawing Sheets

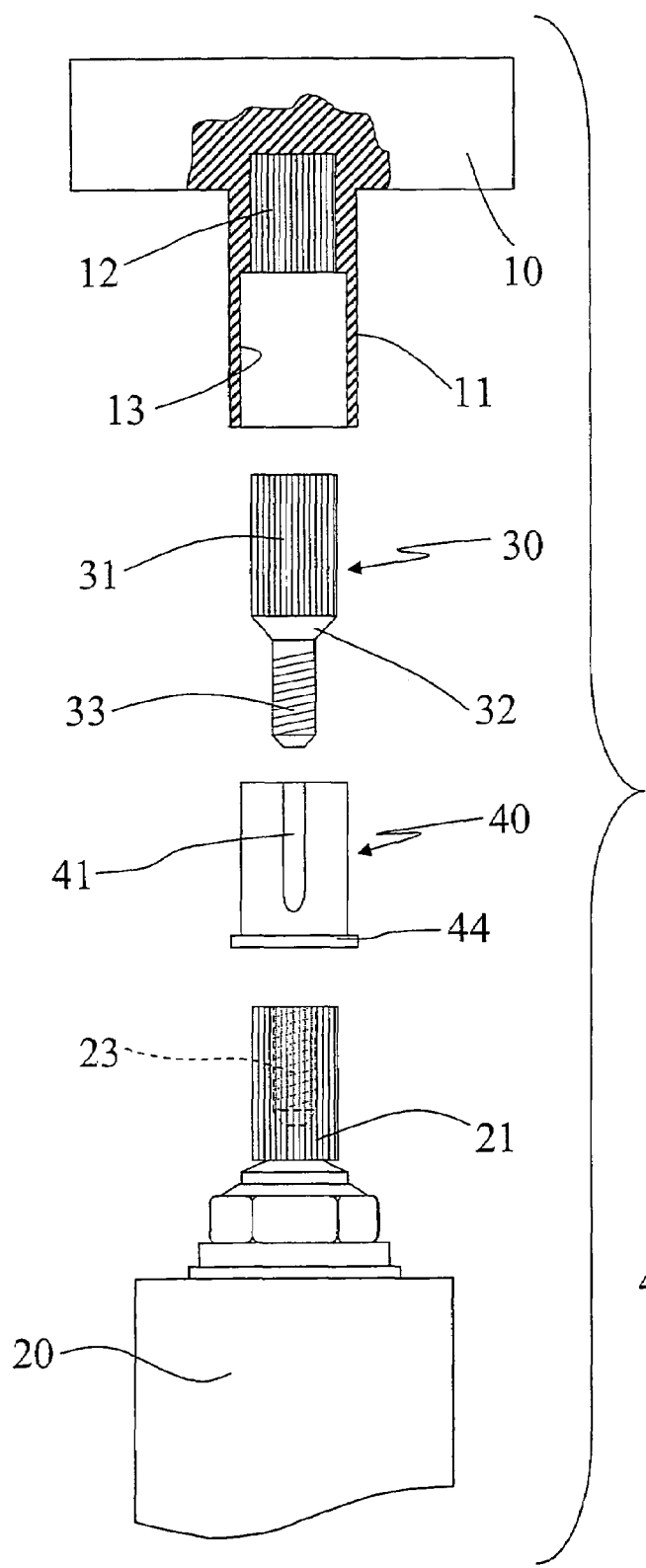
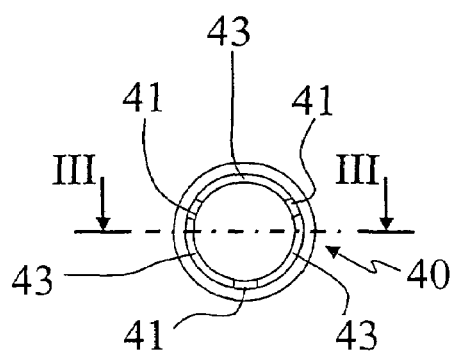
Fig. 1
Fig. 2

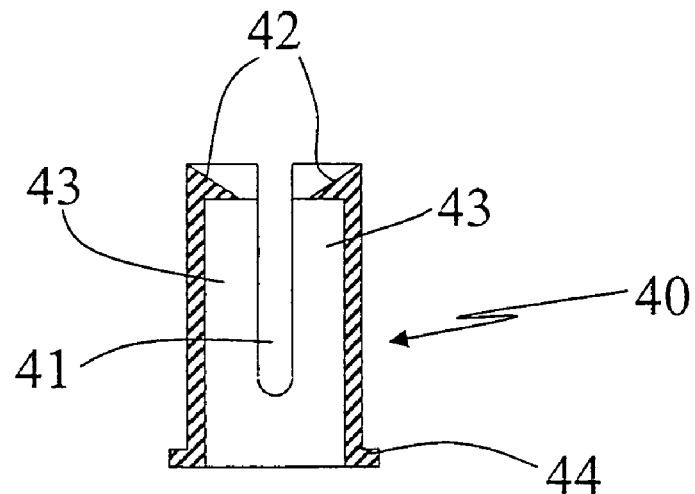
Fig. 3
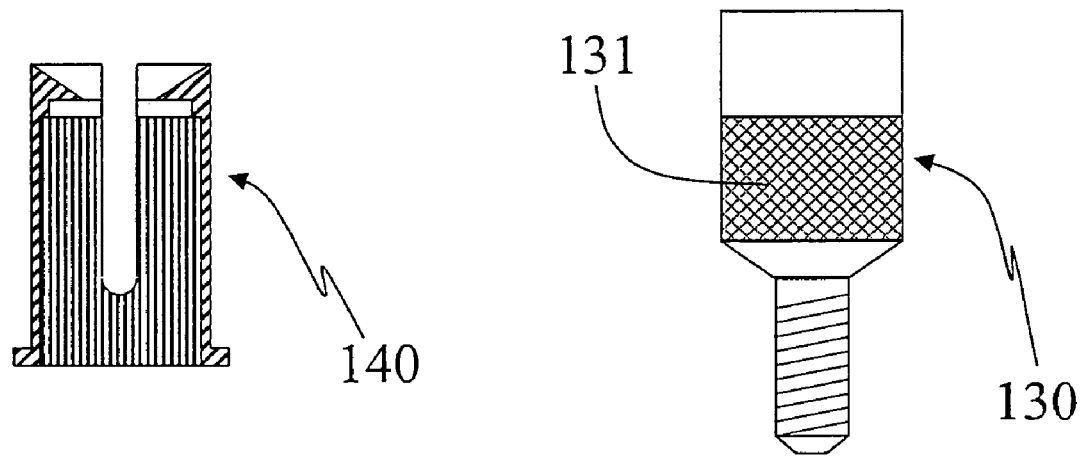
Fig. 4A
Fig. 4B

DEVICE FOR FIXING A TAP HANDLE

BACKGROUND OF THE INVENTION

The present invention relates to a device for fastening a handle to a tap and, particularly, a device allowing the handle to be fastened to a tap in a removable way, at any desired orientation.

Tap handles of the known type are provided with a hub portion designed to be rotatably integrally fastened to the control rod of the valve, i.e. the control rod of the tap valve.

In order to enable rotary drive, the inside seat which is located in the hub portion of the handle and the outer surface of the control rod of the valve are generally subjected to mutually complementary broaching workings. The locking of the handle in the axial direction relative to the control rod of the valve is generally carried out by means of a screw which is engaged with a threaded axial hole situated on the control rod of the valve. Shapes and sizes of broaching and threadings are currently widely standardized in the valve field.

However, this fastening system does not allow the handle to be assembled at a well-accurate orientation. In fact, even in the case of broaching having a large number of teeth, the assembling of a handle at a desired orientation is particularly hard and laborious.

This may compromise the aesthetics of installation, for example in the case where it is desired that the handles of two or more taps being installed next to one another should have the same alignment. This need is particularly felt mainly for those taps having a particularly sophisticated aesthetical appearance, such as those taps manufactured according to the "minimalist" concepts for which some geometrically simple and clear lines and shapes are combined.

In order to partially solve this problem, some special valves which may be oriented to a certain extent relative to the tap body have been proposed. Besides being more expensive than the usual ones, the special valves of this type are even difficult to mount, especially in the step where the desired orientation requires to be set.

Another partial solution to this problem is to fasten the handle by means of a radial grub screw abutting against the control rod of the valve. In this case, at least one hole requires to be provided into the handle hub in order to enable the screwing of the grub screw. However, this solution may compromise the aesthetical appearance of the handle because even in the case where a headless screw (or grub screw) is used, a hole in the handle hub or, even worse, a fastening screw protruding from the handle hub will be always visible.

Having said that, the task of the present invention is to provide a device allowing a tap handle to be fastened at any desired orientation.

SUMMARY OF THE INVENTION

Within the scope of this task, it is an object of the present invention to provide a device of the above mentioned type allowing a handle to be fastened in a particularly simple and cost-effective way.

It is another object of the present invention to provide a device of the above mentioned type which may be easily mounted with no need for handles and/or valves currently available on the market to be modified.

It is a further object of the present invention to provide a device of the above mentioned type allowing the handle to be fastened without compromising the aesthetics of installation.

In accordance with the invention, these objects are achieved by means of a device for fastening a tap handle in a removable way, characterized by including at least one elastically deformable element comprising one or more surface portions suitable to abut against the inner wall of the hub portion of the handle and at least one actuating element to be engaged by screwing with the control rod of a tap valve.

According to the preferred embodiment of the present invention, the elastically deformable element consists of a cylindrical bush which is provided with one or more longitudinal slots extending at least up to one of the ends of the bush. At this end, the bush may include at least one flared surface portion.

The actuating element comprises in turn at least one coupling portion designed to be housed inside a respective seat Into the handle hub. There is further provided a portion having a sloping external surface, such as a truncated cone-shaped portion, which is intended to abut either against one end of the bush or, if provided, against a sloping surface portion of the flaring at one end of the bush. The actuating element is made complete by a threaded portion intended to be screw engaged with the axial hole provided in the control rod of a tap valve.

The locking action exerted by this device can be easily guessed. The actuating element assembled inside the handle, such as to be rotatably integral therewith, is inserted into the elastically deformable bush, their respective sloping surfaces facing each other. By acting on the handle, the actuating element is screwed into the threaded axial hole provided on the control rod of the valve; following the screwing, the actuating element expands the bush such that one or more outer surface portions of the latter abuts against the inner wall of the handle hub. After an adequate clamping force has been obtained, the screwing is then carried out until the desired orientation of the handle relative to the body of the tap is achieved. It is understood that such a fastening type identically allows the removal of the handle which requires in any case to be initially unscrewed up to overcome the clamping force.

Some of the advantages of the present invention are immediately understood. For example, the fastening device may be employed without bringing any modifications to the standard components currently available on the market, particularly handles and valves, and thus it may be also applied to preexisting installations. Furthermore, since the fastening device according to the invention does not provide any element outside the handle, aesthetics of installation is also improved compared to what can be achieved by the fastening devices of the known type.

Further characteristics and advantages of the present invention will be better understood from the following description, which is given by way of illustrative and non-limiting example, with reference to the annexed schematic drawings, in which:

BRIEF DESCRIPTION OF DRAWINGS

FIG. 1 is a disassembled condition view of a fastening device according to a possible embodiment of the present invention together with a handle and a tap;

FIG. 2 is a top plan view of an elastically deformable element of the fastening device shown in FIG. 1;

FIG. 3 is a longitudinal section view of the element from FIG. 2 according to plane III-III shown in the same FIG.;

FIG. 4A is a longitudinal section view of another embodiment of the elastically deformable element for a fastening device according to the present invention; and FIG. 4B is an elevational view of an actuating element to be coupled with the elastically deformable element from FIG. 4A.

DETAILED DESCRIPTION OF EMBODIMENTS

In FIG. 1 there is shown a control handle 10 to be fastened to the control rod 21 of a tap valve 20.

The handle 10 is provided with a hub 11 comprising a cylindrical seat 13 therein with at least one surface portion 12 having a broaching that matches the broaching of the cylindrical rod 21 of the valve.

A fastening device according to the present invention essentially consists of at least one actuating element 30 to be screw engaged with the control rod 21 of the tap valve 20 and at least one elastically deformable element 40.

The actuating element 30 comprises a cylindrical coupling portion 31, the size and broaching thereof matching the ones of portion 12 into the seat provided within the hub 11 of handle 10. The actuating element 30 further comprises an intermediate portion 32 having a substantially conical shape such as to have a sloping surface portion suitable to abut either against one end of the bush or, if provided, against a respective sloping superficial portion 42 provided at one end of the elastically deformable element 40 (FIG. 3). At the other end, the actuating element 30 comprises at least one threaded portion 33 to be screw engaged with the threaded axial hole 23 provided in the control rod 21 of the valve.

The actuating element 40 may be either provided as one piece, or may consist of several separate pieces (or portions) which can be assembled to each other upon mounting.

Also with reference now to FIGS. 2 and 3, the elastically deformable element 40 consists of a cylindrical bush which is provided with one or more longitudinal slots 41 extending at least up to one of the ends of the bush 40. In the embodiment shown in FIG. 2 three slots 41 are provided, which are angularly equidistant to one another and define as many deformable portions 43 in the bush 40.

As it may be seen from the section view from FIG. 3, the bush 40 may also include a flared surface portion 42 at the end where the slots 41 open. The flared portion 42 is abutted by the portion 32 of the actuating element 30. By screwing the actuating element 30 together with the threaded portion 33 thereof into the hole 23 provided on the rod of the valve, the cone-shaped portion 32 acts either on the end of the bush, or the flared surface portion 42 of the bush 40, such that the deformable portions 43 abut against the inner wall 13 of the hub portion 11 of handle 10.

Advantageously, the bush 40 may also comprise a circumferential flange 44 protruding from the opposite end relative to the end where the slots 41 open, in order to give the bush itself a greater strength.

In the embodiment from FIGS. 1-3, the bush 40 has a substantially smooth inner surface, or anyway free of any broaching.

In an alternative embodiment, such as shown in FIGS. 4A and 4B, the fastening device may be manufactured by a bush 140 which is provided with a broached inner surface intended to be directly fitted on the control rod 21 of the valve, whereas the actuating element 130 has a cylindrical shape and a size such as to allow an interference coupling or, in any case, a firm fastening by means of known means and/or methods, within the seat 12 and/or 13 provided in the handle hub 10. The outer surface of the coupling portion may be also processed, all or part, for example with knurl or the like, such as to facilitate the fastening thereof within the handle 10.

In any case, it is understood that a locking device according to the present invention is free of radial locking elements protruding from the hub of the control handle, or anyway free of radial locking elements that may be operated through a hole made in this hub. Therefore, the handle hub may be advantageously manufactured by a side surface which is free of transverse through holes.

Various modifications may be carried out without departing from the scope of the present invention. As mentioned above, the actuating element may be manufactured in several pieces, for example by manufacturing the portions 31 and 32 separately from the threaded portion 33. In this case, the portions 31 and 32 may be manufactured either as one piece, or even as two separate pieces, provided with a threaded through hole where a screw that will protrude from the remaining piece in order to form the threaded portion 33 is engaged. In the same way, the bush 40 may be also manufactured either by a number of slots 41 other than what has been shown, or being even free of a flared surface portion 42.

The invention claimed is:

1. A device to fasten a tap handle in a removable way, including at least one elastically deformable element comprising one or more surface portions suitable to abut against an inner wall of a hub portion of a handle and at least one actuating element to be screw engaged with a control rod of a tap valve, wherein the actuating element is directly assembled to the hub portion so as to be rotatably integral therewith.

2. The device according to claim 1, wherein said elastically deformable element includes a cylindrical bush which is provided with one or more longitudinal slots.

3. The device according to claim 2, wherein said longitudinal slots extend at least up to one of the ends of said bush.

4. The device according to claim 2, wherein said bush includes a flared surface portion at least at one of the ends thereof.

5. The device according to claim 2, wherein said bush includes at least one circumferential flange protruding from at least one of the ends thereof.

6. The device according to claim 2, wherein said bush has a substantially smooth inner surface that is free of broaching.

7. The device according to claim 2, wherein said bush has a broached inner surface.

8. The device according to claim 1, wherein said actuating element comprises at least one coupling portion suitable to be housed inside one respective seat of the hub portion.

9. The device according to claim 8, wherein the coupling portion of said actuating element has a substantially cylindrical shape with broaching on the outer surface thereof that is suitable to be coupled with the seat having internal broaching that is provided in the hub portion of the tap handle.

10. The device according to claim 8, wherein the coupling portion of said actuating element has a substantially cylindrical shape sized to allow interference coupling within the seat provided in the hub portion of a the tap handle.

11. The device according to claim 2, wherein said actuating element comprises at least one portion having a sloping outer surface suitable to abut against at least one end of said bush.

12. The device according to claim 1, wherein said actuating element comprises at least one threaded portion suitable to be screw engaged with an axial hole located in the control rod of a tap valve.

13. A tap comprising at least one closing valve and one control handle which is mounted on the control rod of said valve, comprising the device according to claim 1.

14. The tap according to claim 13, wherein said device is free of radial locking elements either protruding from the hub of said control handle or that can be operated through a hole made in this hub.

15. The tap according to claim 13, wherein the hub of said handle has a side surface which is free of cross through holes.

16. A device for fastening a tap handle in a removable way, including at least one elastically deformable element comprising one or more surface portions suitable to abut against an inner wall of a hub portion of a handle, and at least one actuating element to be screw engaged with a control rod of a tap valve, wherein said actuating element comprises at least one coupling portion suitable to be housed inside one respective seat of the hub portion.

17. The device of claim 16, wherein the coupling portion of said actuating element has a substantially cylindrical shape with broaching on the outer surface thereof that is suitable to be coupled with the seat having internal broaching that is provided in the hub portion of the tap handle.

18. The device of claim 16, wherein the coupling portion of said actuating element has a substantially cylindrical shape sized to allow interference coupling within the seat provided in the hub portion of the tap handle.

19. The device of claim 16, wherein said elastically deformable element includes a cylindrical bush provided with one or more longitudinal slots.

20. A tap comprising at least one closing valve and one control handle which is mounted on the control rod of said tap valve, comprising the device according to claim 16.

* * * * *